(12) United States Patent
Koss

(10) Patent No.: US 7,219,168 B2
(45) Date of Patent: May 15, 2007

(54) METHOD AND SYSTEM FOR A GENERIC DOCUMENT PROCESSING DEVICE CLIENT

(75) Inventor: Scott Craig Koss, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 669 days.

(21) Appl. No.: 09/784,227

(22) Filed: Feb. 13, 2001

(65) Prior Publication Data
US 2002/0112037 A1 Aug. 15, 2002

(51) Int. Cl.
*G06F 3/00* (2006.01)
(52) U.S. Cl. .......................... 710/16; 709/223; 709/250; 358/1.9; 358/1.15
(58) Field of Classification Search ................ 709/250; 710/15–19
See application file for complete search history.

(56) References Cited

U.S. PATENT DOCUMENTS

| | | | |
|---|---|---|---|
| 5,873,659 A | | 2/1999 | Edwards et al. |
| 5,901,286 A | | 5/1999 | Danknick et al. |
| 6,166,826 A | * | 12/2000 | Yokoyama ................. 358/1.16 |
| 6,184,996 B1 | * | 2/2001 | Gase ......................... 358/1.15 |
| 6,240,456 B1 | * | 5/2001 | Teng et al. ................. 709/230 |
| 6,552,816 B1 | * | 4/2003 | Shima ........................ 358/1.15 |
| 6,587,217 B1 | * | 7/2003 | Lahey et al. ............... 358/1.15 |
| 6,778,289 B1 | * | 8/2004 | Iwata ........................ 358/1.15 |
| 6,842,262 B1 | * | 1/2005 | Gillihan et al. ............ 358/1.15 |
| 6,941,523 B1 | * | 9/2005 | Mathieson ................... 715/809 |

FOREIGN PATENT DOCUMENTS

JP 11316658 11/1999

OTHER PUBLICATIONS

Internet Printing Protocol/1.0 (IPP) [RFC-2566] IPP/1.0 Model and Semantics, R. deBry, et al., IETF Experimental, Apr. 1999.

Yahoo—NEC Technologies Introduces the Supercript 4600N, http://biz.yahoo.com/prnews/991102/ca__nec__new__1.html (4 pages).

SSF 97 Recap "Embedded Controllers" *The Seybold Editors' Analysis of Seybold San Francisco '97*, (2 pages) http://www.seyboldseminars.com/News//sf97/PS270510.HTM.

Overview (SuperScript 4650, NEC PrintAgent, Remote Printing, Pull Printing, NEC PrintAgent Server Installation) (6 pages) http://redips2.hde.com/nc4650nr/help/Overview/Overview.htm.

"redipS Driverless Printing Technology," Testdrive redipS, HDE, Inc. 1999, http://www.hde.com/redipsfrontend.html (2 pages).

"redipS—An Introduction," HDE, Inc. 1999, www.hde.com (2 pages).

* cited by examiner

*Primary Examiner*—Eron J. Sorrell
(74) *Attorney, Agent, or Firm*—Marger Johnson & McCollom, P.C.

(57) ABSTRACT

A method for network printing. The method includes activating an interface between a document processing device and a workstation, providing at least one user interface to a user at the workstation. The interface allows the user to select operational settings for the document-processing device. The system then generates a document data file in accordance with the operational settings and communicates a location of the document data file and any auxiliary information to the document-processing device. This activates a document-processing job. The interface then receives a completion message upon completion of the document-processing job.

20 Claims, 2 Drawing Sheets

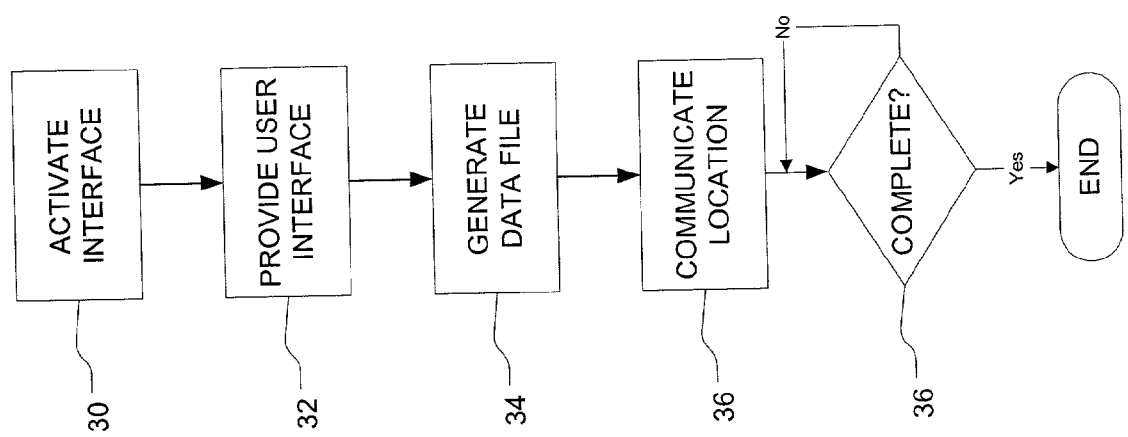

METHOD AND SYSTEM FOR A GENERIC DOCUMENT PROCESSING DEVICE CLIENT

BACKGROUND

1. Field

This disclosure relates to document device drivers, more particularly to generic document processing clients for networked printers.

2. Background

In a typical office environment, users have access to several different types of devices for processing documents across a network. The devices may include printers, fax machines with dedicated phone lines, network fax machines that fax across a network, such as the Internet, plotters, enterprise document management (EDM) systems and knowledge management systems, as examples. The documents discussed here may include text documents, images, drawings, spreadsheets among many other user-generated items that user desire to be processed. Similarly, processing of these documents may include faxing, printing, copying, converting to different formats, entry into EDM and knowledge management systems, among others.

Currently, document processing typically involves having a device specific driver on the user's workstation. The user desiring the processing will request the processing from within the document generation application that user is running. The document generation application hands the document off to the device-specific driver and the driver converts it into the appropriate format for that device.

For example, a user desires to print a document from Microsoft® Word®. The user selects File>Print from the pull-down menu or selects the printer icon from a toolbar. Word then accesses the driver for the default printer. The default printer has been previously designated by the user and the appropriate driver has been loaded and identified as the default driver. The driver then converts the document into a print data file and sends it to the printer. The print data file then enters the printer queue and when the printer reaches that point in the queue, the document is printed.

There are several undesirable issues with this type of application. For example, the user may want to designate another printer but does not have the appropriate driver installed. The user can easily designate another network printer but then has to wait while the appropriate driver is accessed. If the appropriate driver is not installed, the user then has to locate the driver and provide it to the workstation for installation.

A larger problem is management of networked printers. Every time a new printer is added to a network, each workstation that may need access to that printer must have the specific driver for that printer installed. In larger networks, this can be time consuming and tedious to install and track all of the various copies of the printer drivers.

The problem becomes even more problematic when several different varieties of printers are on the network. When several different types of networked document processing devices are available, each type having several different varieties, management of the drivers may become oppressive.

Therefore, it would be desirable for a generic, non-device-specific driver to be installed on each workstation for interfacing with several different kinds of networked document processing devices, as well as several different varieties of each type.

SUMMARY

One aspect of the disclosure is a method for network printing. An interface between a document processing device and a workstation is activated. The interface provides a user interface to a user at the workstation, allowing the user to select operational settings for the document-processing device. A document data file is generated in accordance with the operational settings. The location of the document data file and any auxiliary information is communicated to the document-processing device, activating a document-processing job. The interface then receives a completion message upon completion of the document-processing job.

Another aspect of the disclosure is a network document processing system. The system includes a generic document processing client installed on at least one workstation connected to a network, a job file store connected to the network and at least one document processing device.

BRIEF DESCRIPTION OF THE DRAWINGS

The invention may be best understood by reading the disclosure with reference to the drawings, wherein:

FIG. 3 shows a block diagram of a method for network printing, in accordance with the invention.

DETAILED DESCRIPTION OF THE EMBODIMENTS

A few solutions have been proposed to assist in solving the dedicated device-specific driver installed on each workstation. HDE, Inc., which recently became part of Peerless Systems, Inc., has two such solutions. In a first approach, a pull printing approach is initiated with a web browser. A user fills out a web page of information, which includes a path to the file to be printed. The user file is then pulled to an intermediate server, referred to as the Pull Printing Server, when the file is then processed with a traditional print driver and the resulting stream is sent to the printer. This alleviates having to proliferate the drivers to each workstation for each device, however the pull-printing server can be problematic.

Although the drivers for each device do not need to be proliferated throughout the network to each workstation, each pull-printing server must have the proper drivers. Additionally, the user must launch the web browser, as the process does not work within any given application. Finally, the pull printing server must have at least a portion of the user application to process the application file sent to the pull printing server.

Another solution, again by HDE, Inc., is remote printing. The user installs a printer specific print driver that allows the user to print across the Internet. The printers must be "redipS" enabled, which is a proprietary HDE technology. Further, the remote printing only works with one type of printer, NEC SuperScript 4650 printers.

Neither of these solutions solves the problems mentioned above. Each still requires a device-specific driver, or cannot be handled from within a user application. Additionally, both are print specific, not addressing access to other types of document processing devices.

Figure 1:
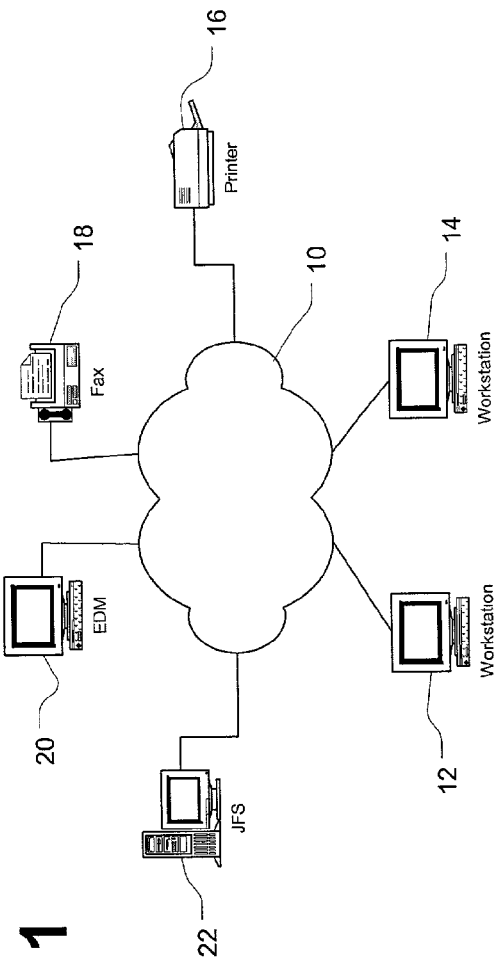
FIG. 1 shows one example of a network with several different document-processing devices connected to it, in accordance with the invention.

FIG. 1 shows a network document processing system, in accordance with the present invention. At least one workstation, such as 12 and 14, are connected to the network. At least one of the workstations has installed on it a generic document-processing client. As will be discussed in more detail further, the generic document-processing client provides an interface between the workstation and different types of document processing devices also connected to the network. The term workstation as used here will include any type of device that has a display and is capable of connecting to a document-processing device. This includes, but is not limited to, desktop computers, laptop computers, personal digital assistants, even cellular telephones that allow users to browse networks that may contain documents to be processed.

Document processing devices may include printers, fax machines with dedicated phone lines, network fax machines that fax across a network, such as the Internet, plotters, enterprise document management (EDM) systems and knowledge management systems, as examples. The documents discussed here may include text documents, images, drawings, spreadsheets among many other user-generated items that user desire to be processed. Similarly, processing of these documents may include faxing, printing, copying, converting to different formats, entry into enterprise document management (EDM), language translation servers, and knowledge management systems, among others. As examples, document-processing devices including a printer 16, a fax machine 18, an interface to an EDM system 20, is shown connected to the network 10.

In addition, a job file store (JFS) 22 is shown connected to the network. As will be discussed in further detail with regard to FIGS. 2 and 3, the job file store serves as a repository of document data files generated by the generic document-processing client.

Figure 2:
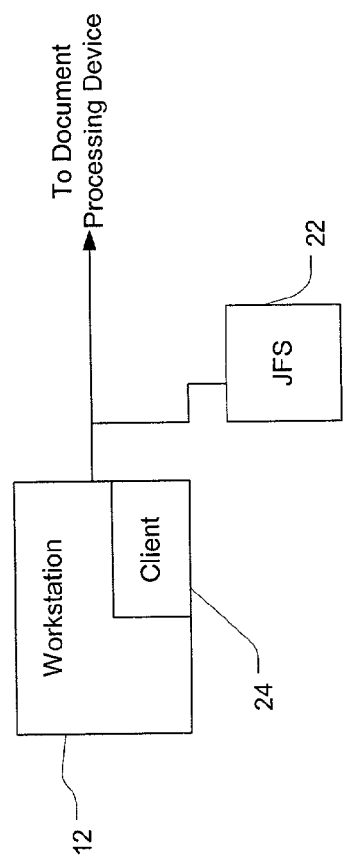
FIG. 2 shows a block diagram of an interaction between a workstation and a document-processing device, in accordance with the invention.

Referring now to FIG. 2, one of the workstations 12 connected to the network 10 in FIG. 1 is shown in more detail. The workstation 12 has installed on it a generic document-processing client 24. The workstation is connected to various document processing devices through the network 10. The generic document-processing client 24 allows the user to interact with any of these devices without requiring a device-specific driver for each device to be installed on the workstation 12. In some cases, the document processing client 24 may be a printer client, a fax client, operable to interact with either a dedicated fax machine or a network fax machine that uses a network to transmit documents in traditional fax format, an EDM client or a knowledge management system client.

The interaction between the generic document processing client, the user's workstation and the document-processing device will be discussed with reference to FIG. 3. In a specific example, a user desires to print a document. The user may be working in an application such as one of the Microsoft® Office® products, or any other document generation application. The user then selects to print the document, in this example. The selection of the application print function launches the generic document-processing client. The generic document processing client then locates the designated device, in this case a printer, and acts as an interface between that device and the user application at 30.

Once the generic document-processing client locates the device, it accesses the various operational settings available to the user, typically in the form of a network interface, such as a web page. It then provides a user interface to the user at 32. The user interface may include launching a web browser to allow the user to view and make selections from settings on a web page. The user makes the necessary selections. In the example of a printer, the settings may be such things as number of copies, page orientation, stapling options, paper selection, etc. Once the user makes those selections, a document data file is generated in accordance with any of the settings necessary to create that file at 34. In this example, the document data file will be a printer data file, which is device independent.

Once the document data file is generated, it is stored in a job file store. Referring back to FIG. 2, the JFS may be a separate device from the workstation on the document-processing device. Alternatively, the JFS may be part of the workstation or the printer. The document-processing client then communicates the location of this job file store and the auxiliary information to the printer. Auxiliary information may include the document data file size, and user selected operational settings. In the example of the network being the Internet or in compliance with the Internet Protocol (IP), the location will be communicated as a Uniform Resource Locator (URL).

In this example, the printer will receive this URL and then retrieves the document data file. In the above example, the document data file will be a device independent printer data file. The printer will then print the job as determined by the user. Once the print job is completed, a message is sent back to the document-processing client to communicate completion to the user at 38. The document-processing client monitors the completion of the job until this message is received. At that point, the process ends until the user wants to process another document.

Typically, this system and method will be implemented in a software package installed on the workstation. Some sort of computer readable storage medium, such as a CD-ROM or a diskette, will contain software code. The software code, when executed, will result in the process described above. The software code may also take the form of a downloadable file, or a print driver, for the example above of a printer discussed above. More generally, the computer-readable storage medium will include a document-processing client operable to perform the methods of the invention.

Thus, although there has been described to this point a particular embodiment for a method and apparatus for a generic document processing client, it is not intended that such specific references be considered as limitations upon the scope of this invention except in-so-far as set forth in the following claims.

What is claimed is:

1. A method for network document processing, the method comprising:

locating a network connection from a workstation that has a generic driver to a document processing device that is connected to said network, said generic driver requiring operational settings from said document processing device in order to process a document on said document processing device, activating a first interface between said document processing device and said workstation whereby said workstation can access a plurality of operational settings of said document processing device that are necessary for said generic printer driver to process a document on said document processing device;

providing a user interface to said workstation, whereby a user can through said user interface and said first interface select said necessary operational setting for said document processing device;

using said generic printer driver to generate a document data file at a particular location that contains the operational settings obtained through said first interface; and communicating said particular location of said document data file to said document processing device and activating a document processing job to be executed in accordance with operational settings selected by said user.

2. The method of claim 1, wherein activating an interface further comprises launching a document processing client in response to a document processing request by the user.

3. The method of claim 1, wherein activating an interface further comprises launching and retrieving web pages to display capabilities of the document processing device.

4. The method of claim 1, wherein the user interface is a web page.

5. The method of claim 1, wherein generating a document data file further comprises storing the document data file on a job file store.

6. The method of claim 1, wherein communicating a location further comprises sending a Uniform Resource Locator to the predetermined document-processing device.

7. The method of claim 1, wherein the plurality of operational settings includes number of copies, stapling options, and paper selection.

8. The method of claim 1, wherein the document processing device is one of the group comprising: a printer, a fax machine, a multi-function peripheral, an electronic document management system, a plotter, a network fax machine, a language translation server and a knowledge management system.

9. A computer-readable storage medium storing software code that, when executed, results in executing the method recited in claim 1.

10. The computer-readable storage medium of claim 9, wherein the software code is a downloadable file.

11. The computer-readable storage medium of claim 9, wherein the software code is a generic printer driver to be installed on each workstation of a network.

12. The computer-readable storage medium of claim 9, wherein generation of a document data file comprises generation of a document data file based on the operational settings.

13. A network document processing system, comprising:
a generic document processing client installed on a workstation connected to a network, said document processing client being operable to interact with several different types of document processing devices by
activating a first interface between said document processing device and a said workstation whereby said workstation can access a plurality of operational setting of said document processing device that are necessary for said generic printer driver to process a document on said document processing device; and
providing a user interface to said workstation, whereby a user can through said user interface and said first interface select said necessary operational setting for said document processing device;
a job file store, operable to receive document data files generated by said generic document processing client; said files including operational settings obtained through said first interface; and
a document-processing device, operable to receive a location of the document data files and auxiliary information associated with each document data file from said document-processing client, and to operate on said document data file in accordance with said auxiliary information.

14. The system of claim 13, wherein the document-processing client is one of the group comprised of: a printer client, a fax client, an electronic document management system client, a language translation client, and a knowledge system management client.

15. The system of claim 13, wherein the job file store is located on the workstation upon which is installed the document processing client.

16. The system of claim 13, wherein the job file store is located on another device connected to the network.

17. The system of claim 13, wherein the job file store is a dedicated device.

18. The system of claim 13, wherein the document processing device is one of the group comprising: a printer, a fax machine, a multi-function peripheral, an electronic document management system, a plotter, a network fax machine, a language translation server, and a knowledge management system.

19. The method of claim 1, wherein generating a document data file comprises generating a document data file based on the operational settings.

20. A method for network document processing, the method comprising:
locating a network connection from a workstation that has a generic driver to a document processing device that is connected to said network, said generic driver requiring operations setting from said document processing device in order to process a document on said document processing device,
activating a first interface between said document processing device and a said workstation whereby said workstation can access a plurality of operational setting of said document processing device that are necessary for said generic printer driver to process a document on said document processing device;
providing a user interface to said workstation, whereby a user can through said user interface and said first interface select said necessary operational setting for the document processing device;
using said generic printer driver to generate a document data file that contains the operational settings obtained through said first interface, said document being stored at a particular location; and
communicating said particular location of the document data file to said document processing device, thereby activating a document processing job to be executed in accordance with operational settings selected by the user.

* * * * *